(12) United States Patent
Zhang et al.

(10) Patent No.: US 8,861,873 B2
(45) Date of Patent: Oct. 14, 2014

(54) IMAGE CLUSTERING A PERSONAL CLOTHING MODEL

(75) Inventors: Tong Zhang, San Jose, CA (US); Wei Zhang, Fremont, CA (US); Daniel Tretter, San Jose, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 26 days.

(21) Appl. No.: 13/642,352

(22) PCT Filed: Aug. 2, 2010

(86) PCT No.: PCT/US2010/044135
§ 371 (c)(1),
(2), (4) Date: Oct. 19, 2012

(87) PCT Pub. No.: WO2011/152843
PCT Pub. Date: Dec. 8, 2011

(65) Prior Publication Data
US 2013/0064460 A1    Mar. 14, 2013

Related U.S. Application Data

(60) Provisional application No. 61/350,461, filed on Jun. 1, 2010.

(51) Int. Cl.
*G06K 9/62* (2006.01)
*G06K 9/00* (2006.01)

(52) U.S. Cl.
CPC .......... *G06K 9/6218* (2013.01); *G06K 9/00677* (2013.01)
USPC ....................................................... 382/225

(58) Field of Classification Search
None
See application file for complete search history.

(56) References Cited

U.S. PATENT DOCUMENTS

| 2006/0251339 A1 | 11/2006 | Gokturk et al. |
| 2007/0237355 A1 | 10/2007 | Song et al. |
| 2008/0317353 A1 | 12/2008 | Chien |
| 2010/0074540 A1 | 3/2010 | Tang et al. |

OTHER PUBLICATIONS

Elie El-Khoury et al., "Face-and-Clothing Based People Clustering in Video Content", MIR'10, Mar. 29-31, 2010, Philadelphia, Pennsylvania, USA, Copyright 2010 ACM, 978-1-60558-815-5/10/03.*
Alexander P. Topchy et al., "Analysis of Consensus Partition in Cluster Ensemble", ICDM 2004, 8 pages total.*
Alexander Strehl et al., "Cluster Ensembles—A Knowledge Reuse Framework for Combining Multiple Partitions", Journal of Machine Learning Research 3 (2002), pp. 583-617, published in Dec. 2002.*

\* cited by examiner

*Primary Examiner* — Brian P Werner (57) ABSTRACT

The disclosure is related to a system and method for learning robust clothing clustering based on a cluster ensemble technique applied to the clothing features of images to improve clustering of images. Different types of clothing features that are complementary to each other are computed to provide extensive description of the clothing in the images. Multiple partitions are computed based on the clothing features to generate a cluster ensemble set. A consensus function is applied to the multiple partitions to generate a final clothing consensus clustering that encompasses the information contained in the multiple partitions. A system and method are disclosed for clustering images based on the clothing of one or more persons in the images.

14 Claims, 5 Drawing Sheets

IMAGE CLUSTERING A PERSONAL CLOTHING MODEL

BACKGROUND

This application claims benefit of U.S. Provisional Application No. 61/350,461, filed Jun. 1, 2010.

Clothing-based person clustering can be valuable in many ways, including improving the performance of person clustering in images (such as family photos) and/or helping a person to explore his or her clothing favorites, which information can be used to organize his or her clothes efficiently. Clothing clustering can be used as additional information to complement face-based clustering for improved person clustering, for example but not limited to, in family photos. Examples are disclosed in D. Anguelov, K. Lee, S. Gokturk, B. Surnengen, "Contextual identity recognition in personal photo albums," CVPR 2007; J. Cui, F. Wen, R. Xiao, Y. Tian and X. Tang. "EasyAlbum: An interactive photo annotation system based on face clustering and re-ranking," CHI 2007; A. C. Gallagher and T. Chen. "Using context to recognize people in consumer images," IPSJ Transactions on Computer Vision and Applications, 2009; J. Sivic, C. L. Zitnick and R. Szeliski. "Finding people in repeated shot of the same scene," BMVC, 2006; Y. Song and T. Leung, "Context-aided human recognition—clustering," ECCV 2006.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

An "image" broadly refers to any type of visually perceptible content that may be rendered on a physical medium (e.g., a display monitor or a print medium). Images may be complete or partial versions of any type of digital or electronic image; including: an image that was captured by an image sensor (e.g., a video camera, a still image camera, or an optical scanner) or a processed (e.g., filtered, reformatted, enhanced or otherwise modified) version of such an image; a computer-generated bitmap or vector graphic image; a textual image (e.g., a bitmap image containing text); and an iconographic image.

The term "image forming element" refers to an addressable region of an image. In some examples, the image forming elements correspond to pixels, which are the smallest addressable units of an image. Each image forming element has at least one respective "image value" that is represented by one or more bits. For example, an image forming element in the RGB color space includes a respective image value for each of the colors (such as but not limited to red, green, and blue), where each of the image values may be represented by one or more bits.

A "computer" is any machine, device, or apparatus that processes data according to computer-readable instructions that are stored on a computer-readable medium either temporarily or permanently. A "software application" (also referred to as software, an application, computer software, a computer application, a program, and a computer program) is a set of instructions that a computer can interpret and execute to perform one or more specific tasks. A "data file" is a block of information that durably stores data for use by a software application.

The term "computer-readable medium" refers to any medium capable storing information that is readable by a machine (e.g., a computer). Storage devices suitable for tangibly embodying these instructions and data include, but are not limited to, all forms of non-volatile computer-readable memory, including, for example, semiconductor memory devices, such as EPROM, EEPROM, and Flash memory devices, magnetic disks such as internal hard disks and removable hard disks, magneto-optical disks, DVD-ROM/RAM, and CD-ROM/RAM.

As used herein, the term "includes" means includes but not limited to, the term "including" means including but not limited to. The term "based on" means based at least in part on.

Clothing clustering can be performed by computing distance matrices using different clothing feature types (discussed below), and combining the different clothing features into a single distance matrix by normalizing and then computing a sum of the distance matrices (whether a weighted sum or summing without weights). The single distance matrix can be used to cluster clothes. This integration process can provide less discriminative information.

A system and method are provided for learning robust clothing clusters based on a cluster ensemble technique applied to the clothing features of images to complement face-based clustering to improve person clustering of images. Different types of clothing features that are complementary to each other are computed to provide extensive description of the clothing. Multiple partitions are computed based on these features to provide a final clustering that encompasses all of the information contained in the partitions. Thus, a system and method are provided for clustering images based on the clothing of one or more persons in the image.

In the implementation of the system and method disclosed herein, clothing regions of images are detected and segmented. Clothing features, including color signature $S^{cloth}$ color pyramid $C^{cloth}$ and/or texture pyramid $T^{cloth}$, are extracted. The system and method involve a cluster ensemble approach that directly combines multiple partitions computed based on the extracted clothing features. The combining can be performed without accessing the original clothing features or the algorithms that are used to generate the partitions. The different partitions are fused into a final clothing clustering that encompasses the information contained in the cluster ensemble. The final clothing clustering can be more accurate and more robust in comparison to the original partitions, as discussed below.

Figure 1:
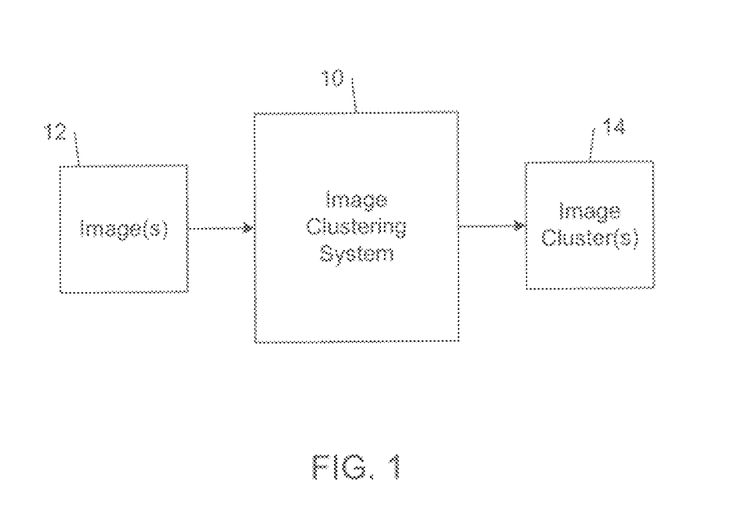
FIG. 1 shows a block diagram of an example of an image clustering system based on clothing-clustering.

FIG. 1 shows an example of an image clustering system 10 that performs clothing-based image clustering on images 12 and outputs several image clusters 14. In the implementation of the image clustering system 10, a cluster ensemble technique is used to combine multiple partitions computed based on clothing features extracted from the clothing regions of the images, and the different partitions are fused into a final clothing clusterina. Image clusters 14 are output. In this way, image clustering system 10 can provide a fully automated process for clustering images.

In an example, to provide the clothing features extracted from the clothing regions of the images, the clothing regions of images 12 are detected and segmented, and the clothing features are extracted from the segmented clothing regions. In some examples, the image clustering system 10 outputs the image clusters 14 by storing them in a data storage device (e.g., in a database), rendering them on a display (e.g., in a user interface generated by a software application program), or rendering them on a print medium (e.g., paper).

In general, the images 12 can be any type of images, including amateur and professional photographs and commercially produced images. In one example use scenario, images 12 in the form of personal photographs are provided. The image clustering system 10 processes the images 12 and outputs the image clusters 14. In this use scenario, the image clustering system 10 allows consumers to perform person clustering of family photos, for example, to create a personalized and themed photo album or photo slide presentation. The image clustering system 10 also can help a person to explore his or her clothing favorites, which information can be used to organize his or her clothes efficiently. In another example use scenario, images 12 in the form of images captured by an image sensor or a processed versions of such images, or textual images, are provided. The image clustering system 10 can apply the clothina-based image clustering for improved person detection and/or identification.

An example source of images 12 is a family collection of photos, which can usually include the same family members, relatives, and friends. An example source of images is photo collections of, e.g., entertainment or sports celebrities, or reality television individuals. The images can be taken over a short span of time, or can have time stamps that extend over several years, such as but not limited to family photos or celebrity images over 10 yrs. An example of images that span a short space of time is consumer photos taken in burst mode, at a family event or a vacation. In an example use scenario, a system and method disclosed herein is applied to images in a database of images, such as but not limited to images captured from imaging devices (such as surveillance devices, or film footage) located at an airport, a stadium, a restaurant, a mall, outside building, etc., to cluster images based on clothing features of one or more individuals, to identify images that include the one or more individuals. In an example implementation, a system and method disclosed herein can be used to locate a missing child at an amusement park, an incapacitated person in need of assistance, a person who has wandered away from an area and become lost, or a criminal attempting to hide in a monitored location (such as buildings, sporting events, concerts, city centers, airports, etc.) for example, based on a description of one or more candidate clothing features of clothes worn by the individual, although it will be appreciated that other uses are possible. Accordingly, if installed in a monitored location, an implementation for locating a target individual or individuals is able to start producing candidate individuals and their locations as soon as search criteria (such as one or more candidate clothing features of clothes) are entered into the system.

Figure 2A:
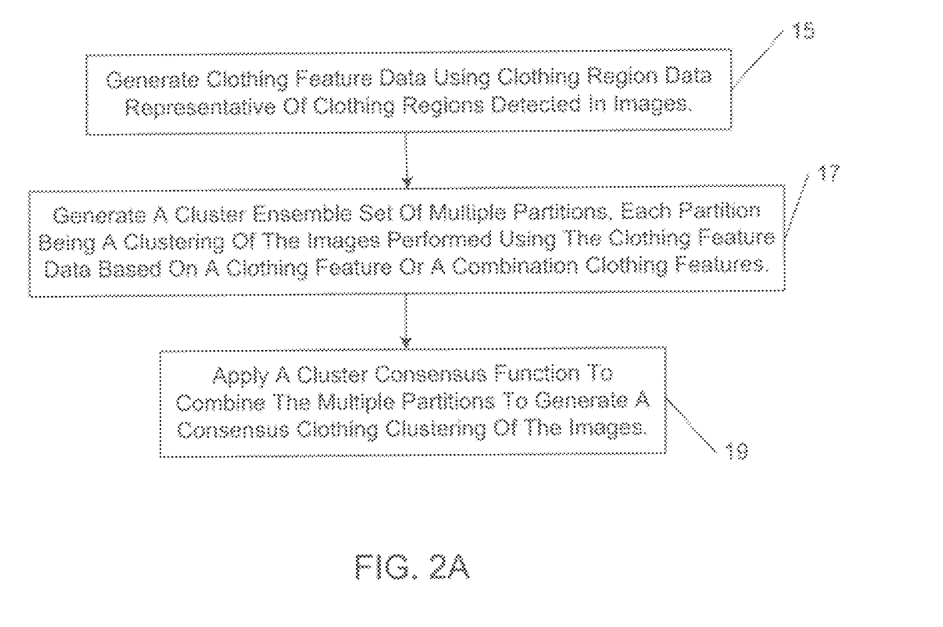
FIG. 2A shows a flow chart of an example process for generating a consensus clothing clustering of images.
Figure 2B:
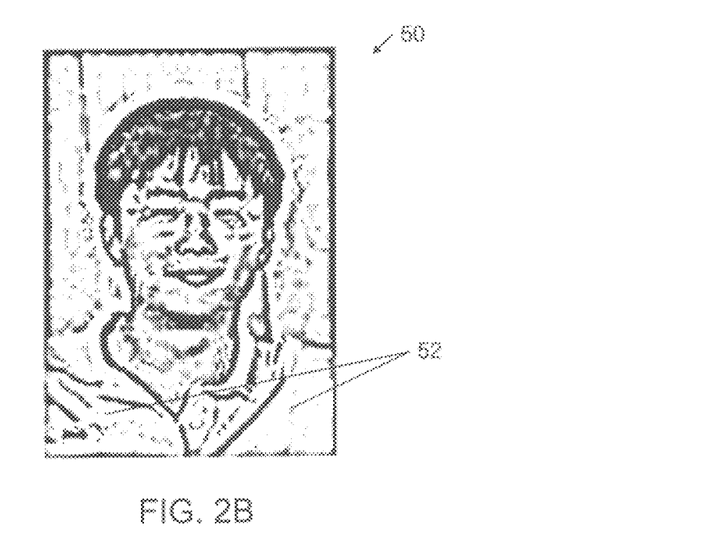
FIG. 2B shows an example image.

FIG. 2A shows a flow chart of an example process for clustering of images based on use of a cluster ensemble set. In block 15, clothing feature data are generated from clothing region data. The clothing region data are representative of clothing regions detected in each image. FIG. 2B shows an example image 50 that includes clothing regions 52 of clothing being worn by a person. The clothing region data can be extracted from image data representative of the image. "Image data" herein includes data representative of image forming elements of the image or of image values. The clothing feature data are representative of clothing features, and are extracted from the clothing region data. In block 17, a cluster ensemble set of multiple partitions is generated using the clothing feature data. Each of the partitions is a clustering of the images that is performed using the clothing feature data. Each partition is generated by clustering the images based on one of the clothing features, or based on a combination of two or more of the clothing features. In block 19, a cluster consensus function is applied to the cluster ensemble set to combine the multiple partitions to provide a consensus clothing clustering of the set of images. The consensus clothing clustering shares nonzero mutual information with each partition of the plurality of partitions. The consensus clothing clustering of the set of images provides a classification of the images.

Each partition can be a different number of clusters based on a given clothing feature or combination of clothing features. For the clothing feature of color, each partition can be generated by clustering images into differing numbers of clusters. For example, if images are clustered into three clusters based on color to provide a first partition, where the first cluster can encompass red, pink, and orange clothing regions, the second cluster can encompass blue and purple clothing regions, and the third cluster can encompass yellow and green clothing regions. To provide a second partition in this example, the images can be clustered into six clusters, where one cluster encompasses red and pink clothing regions, the second cluster encompasses orange clothing regions, another cluster encompasses blue clothing regions, another cluster encompasses purple clothing regions, another cluster encompasses yellow clothing regions, and the sixth cluster encompasses green clothing regions. To provide a third partition in this example, the images can be clustered into greater or fewer numbers of clusters based on color. Partitions can be similarly cienerated from different numbers of clusters generated based on clothing textures, such as but not limited to, plaid, polka dots, stripes, paisley, etc. In another example, partitions are generated based on a clothing feature of shape. In an example, to generate partitions based on a combination of features, different numbers of clusters can be generated based on the following non-limiting example combinations of color and texture: red-paisley, yellow/green-polka dots, blue/purple-stripes, pink-stripes, red-polka dots, or any other possible combinations of the clothing features of color and texture. Thus, the clustering of the images in two or more partitions of the multiple partitions can be based on the same clothing feature (such as but not limited to color), or the same combination of clothing features (such as but not limited to color and texture), where the difference among the two or more partitions is that a different number of clusters is obtained in each partition.

Figure 3A:
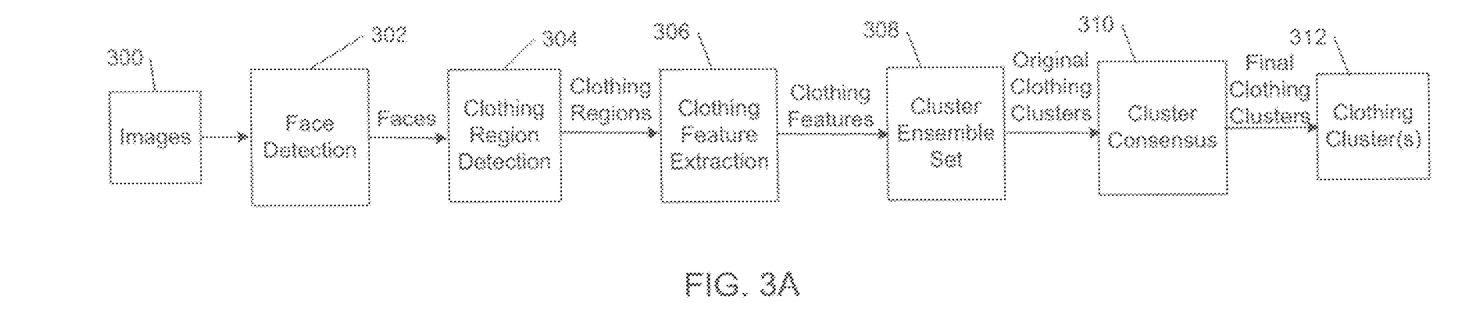
FIG. 3A shows a flow chart of an example process for generating a consensus clothing clustering of images.

A flow chart of a method for image clustering is illustrated in FIG. 3A. In block 300, images are received. Block 302 involves face detection. Face detection is applied to detect at least one face region in the images, for example, using a face detection algorithm. The face detection can be applied to image data. The face detection of block 302 can be performed on the image forming elements of the images. Block 304 involves clothing region detection and segmentation. The clothing region detection and segmentation can be applied to the image data. An example method for clothing region detection and segmentation is as follows. At least one skin region is segmented from the at least one detected face region. The skin tone of the at least one person in the at least one detected face region is extracted. Extraction of the skin tone can involve clustering the pixels densely sampled in the skin regions. The extracted skin tone of the at least one person is used to remove the skin region from the detected hair region to provide the hair tone of the at least one person. The extracted skin tone and the hair tone are used to remove skin regions and hair regions from the first image to provide the clothing regions. In sum, the rough location of clothing region within the images is detected. Refined clothing information is obtained through segmentation of the images involving skin region and/or hair region removal. The clothing region detection and segmentation of block 304 can be performed on the image forming elements of the images. The process for face detection described in block 302 and/or clothing region detection and segmentation described in block 304 can be applicable to any of the systems and methods disclosed herein.

The operation of block 306 of FIG. 3A involves clothing feature extraction. The clothing features are extracted from the clothing regions. The clothing feature extraction can be performed on the image forming elements of the images. Examples of types of clothing features include color signature $S^{cloth}$, color pyramid $C^{cloth}$, and texture pyramid $T^{cloth}$. Each type of clothing feature, including $S^{cloth}$, $C^{cloth}$ and $T^{cloth}$, can be represented using data representative of the given clothing feature. For example, each type of clothing feature, including $S^{cloth}$, $C^{cloth}$ and $T^{cloth}$, can be represented as a value, a vector or a matrix. The clothing features provide complementary information about the clothing regions.

Clothing color signature feature $S^{cloth}$ can be obtained by computing a Gaussian Mixture Modeling (GMM) with diagonal covariance matrix on the color pixels sampled in CIELab space at every 4th pixel (or every pixel, or every 8th pixel, or every 10th pixel, or any other sampling rate) within the clothing segmentation. CIELab is a mathematical derivative of a mathematical model produced by the Commission Internationale de l'Eclairage (CIE) that describes colors using three synthetic primaries: L (indicative of Lightness), a (indicative of red-greenness), and b (indicative of yellow-blueness). Color signature feature $S^{cloth}$ describes the global distribution of the color pixels in CIELab space within the clothing region. It can be robust to imperfect clothing segmentation and background noise. This feature does not depend on local information of the pixels. Spatial relation can be of value for object matching and categorization. See, e.g., S. Lazebnik, C. Schmid and J. Ponce. "Beyond bags of features: spatial pyramid matching for recognizing natural scene categories," CVPR 2006. For clothing clustering, spatial information can be helpful for finding discriminative localized patterns on the clothing.

A clothing color pyramid $C^{cloth}$ feature for clothing can be used to incorporate spatial information into the clothing description. The clothing color pyramid $C^{cloth}$ feature can complement the color signature feature $S^{cloth}$. The clothing color pyramid $C^{cloth}$ feature is based on the spatial pyramid matching method. See, e.g., S. Lazebnik et al. In the computation of a clothing color pyramid $C^{cloth}$ feature, a color codebook with, for example but not limited to, a codebook with 500 codewords, is learned using Gaussian Mixture Modeling on the RGB color pixels densely sampled within the clothing regions. A diagonal covariance matrix is used during codebook learning. For a new piece of clothing, each of its RGB color pixels is quantized to a corresponding codeword (a Gaussian component) which has the minimum Mahalanobis distance to the pixel. By accumulating the counts, a 500 dimensional histogram of the clothing is obtained in this example. In another example, a different number of codewords can be used, and a histogram of a different dimension can be obtained. In order to incorporate the local information of the pixels, the histogram can be embedded into a spatial pyramid. See, e.g., S. Lazebnik, C. Schmid and J. Ponce. "Beyond bags of features: spatial pyramid matching for recognizing natural scene categories," CVPR 2006.

Figure 5:
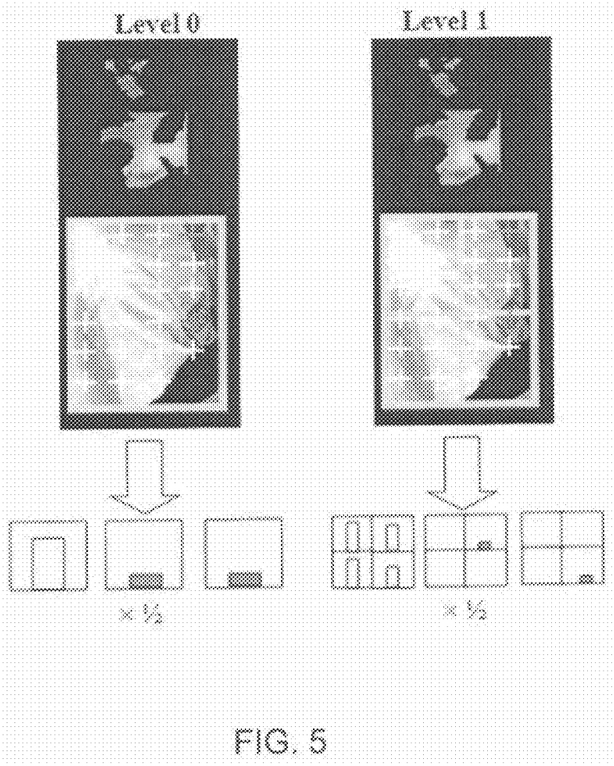
FIG. 5 shows an illustration of a two-level spatial pyramid (yellow grids) placed on clothing region, where the densely sampled color pixels are shown as symbol "+".

The clothing color pyramid $C^{cloth}$ feature can be computed as follows. A sequence of increasingly finer grids is placed over the clothing region. A weighted sum of the number of matches that occur at each level of resolution is taken. For example, a two-level spatial pyramid (5 spatial bins in total) can be used. As illustrated in FIG. 5, the two-level spatial pyramid (the yellow grids) are placed on a clothing region. The densely sampled color pixels are shown as a "+". The number of pixels that fall in each spatial bin are counted into the histogram. The color pixels are placed in the corresponding spatial bins of the pyramid according to their image coordinates. The histograms from all resolutions are weighted and then concatenated into a long feature vector $C^{cloth}$. In the example of FIG. 3A, for a 500 dimensional histogram and 5 spatial bins, the feature vector $C^{cloth}$ is of dimension 500× 5=2500.

The texture feature of clothing can be extracted using a texture pyramid $T^{cloth}$: A spatial pyramid can be used to compute the texture features with embedded spatial information. The extraction of the texture feature is similar to the extraction of the color pyramid feature. However, instead of learning the codebook and histogram on color pixels, they are learned on texture pixels. The computation involves densely sampling the texture pixels by convolving the refined clothing segmentation with multi-scale filter banks. An example filter set is disclosed in J. Winn, A. Criminisi, and T. Minka. "Object categorization by learned universal visual dictionary," ICCV 2005; it is composed of 9 Gaussians, 4 first order derivatives of Gaussians and 4 Laplacian of Gaussians (LoG), applied in CIELab channels. In this example, each texture pixel has a dimension of 17. The texture pyramid feature $T^{cloth}$ is computed similarly to the computation of color pyramid feature. In the example of FIG. 3A, the texture pyramid feature $T^{cloth}$ is also of dimension 2500.

Figure 3B:
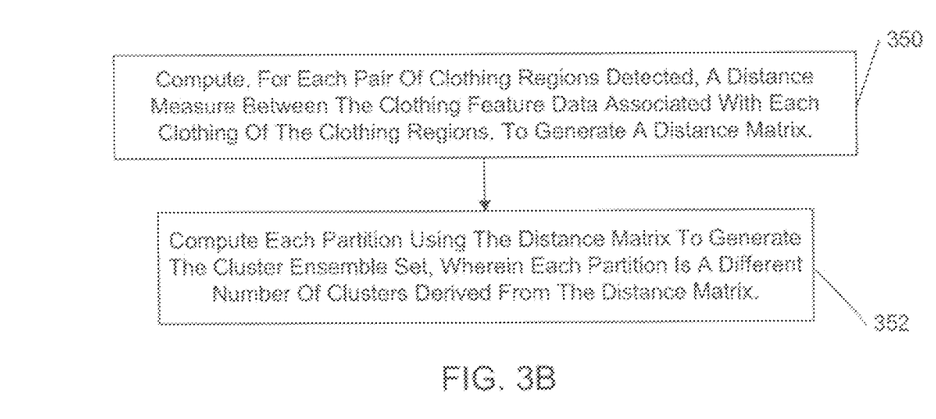
FIG. 3B shows a flow chart of an example process for generating a cluster ensemble set.

In block 308, a cluster ensemble set is computed. The cluster ensemble set is comprised of multiple partitions. Each partition is a clustering of the images that is performed using the clothing feature data. As described previously, the clustering of the images in each partition can be performed based on a clothing feature or a combination of clothing features. In an example, the cluster ensemble set can be comprised of partitions computed according to a distance measure based on the extracted clothing features. FIG. 3B shows a flow chart of a process for generating the cluster ensemble set according to an example. As depicted in block 350, for each pair of clothing regions detected, a distance measure between the clothing feature data associated with each clothing of the clothing regions, to generate a distance matrix. In the example depicted in block 352, each partition of the multiple partitions can be computed using a distance matrix computed based on a clothing feature or a combination of clothing features to provide the cluster ensemble set.

In an example, once a clothing region is detected in an image, it is assigned an index. The clustering can then be performed based on clothing region data representative of the clothing regions detected in images of a set or collection of images, regardless of which image the clothing regions are derived from. For example, if 100 clothing regions are detected from 50 images, the clothing features are generated using clothing region data representing each of these clothing regions. For each pair of clothes regions, regardless of whether the pair comes from the same image, or from different images, a pair-based distance matrix is computed. The different pair-based distance matrices from the pairs of regions form the distance matrix based on which the clothing clustering described herein is performed.

A number of the partitions can comprise a different number of clusters derived from the distance matrix. In an example, to provide the cluster ensemble set, multiple distance matrices are computed based on each single clothing features or combination of clothing features, and multiple partitions, with different numbers of clusters, are computed based on each distance matrix. For example, cluster ensemble set can be derived from separate pair-wise distance matrices based on different types of clothing feature extracted. In an example, a distance metric that can be computed for color pyramid feature vectors $C^{cloth}$, or for texture pyramid feature vectors $T^{cloth}$, is the L1 distance. Also referred to as the city block distance, the L1 distance between two vectors is the sum of the (absolute) differences of their coordinates. In another example, a distance metric for the color signature features $S^{cloth}$ is the Earth Movers Distance (EMD). See, e.g., Y. Rubner, C. Tomasi. and L. Guibas, "The Earth Mover's distance as a metric for image retrieval," IJCV, 2000. The EMD provides for substantially matching the main color patterns of the clothes. EMD may be less sensitive to some subtle or noisy features. From clothing feature matching, distance matrices $D^k = \{d^k_{i,j}, i,j=1, \ldots, N\}$, k=1,2, 3, can be obtained in which each item $d^k_{i,j}$ represents the distance between $i^{th}$ clothing and $j^{th}$ clothing based on their $k^{th}$ type of clothing features (e.g., k being color signature $S^{cloth}$, color pyramid $C^{cloth}$, or texture pyramid $T^{cloth}$).

A cluster ensemble technique is applied to evaluate the information computed using the distance matrices. See, e.g., A. Strehl and J. Ghosh, "Cluster ensembles—a knowledge reuse framework for combining multiple partitions," JMLR, 2002. Cluster ensemble techniques can improve clustering quality and robustness by first computing multiple partitions of a given data set and then combining them to form a final clustering solution. In the implementation of a cluster ensemble technique, it is determined how to generate a cluster ensemble with high quality and diversity, and how to design the consensus function to combine the partitions.

To generate a diverse cluster ensemble set, the number of clusters in the clustering algorithm can be varied. The number of clusters computed using the clustering algorithm can be predetermined. For example, ten (10) different numbers evenly separated within a reasonable range can be selected as the number of clusters. For example, if the range of cluster number is from 20-200, then the ten (10) numbers of clusters may be 20, 40, 60, 80, 100, 120, 140, 160, 180, 200. The different numbers are used to do the clustering, i.e., the data is clustered into 20, 40, 60, 80, 100, 120, 140, 160, 180, and 200 different clusters, thus resulting in 10 different kinds of groupings of the data. Although the example dataset is grouped into 10 numbers of clusters in this example, any predetermined numbers of cluster can be used. The numbers of clusters are selected to create a large cluster set to show the cluster ensemble result.

In the computation of the ensemble set, first a separate clustering is performed based on each type of clothing features. Thus, in an example where there are three (k=3) types of clothing features (color signature $S^{cloth}$, color pyramid $C^{cloth}$, and texture pyramid $T^{cloth}$) three different types of partitions ($C_I$) of the images can be computed (one partition $C_I$ computed for each type of clothing feature). Complementary information can be obtained from the clothing features by computing another set of partitions ($C_{II}$) computed based on combinations of the clothing feature types, which can be expressed as:

$$C_{II} = \left\{ C_{II}^k, k = 1, \ldots, \sum_{k=2}^{K} \binom{K}{k} \right\}$$

where K represents the number of clothing feature types. In one example, for the three clothing features (i.e., with K=3), three different types of partitions can be computed based on three different possible combinations of clothing features: (i) $S^{cloth}$ and $C^{cloth}$; (ii) $S^{cloth}$ and $T^{cloth}$; and (iii) $C^{cloth}$ and $T^{cloth}$. In another example, a fourth type of combination can be computed based on all three clothing features, namely, $C^{cloth}$, $S^{cloth}$ and $T^{cloth}$. The partition $C_{II}^k$ that corresponds to the combination of feature types $\{i, \ldots, k\}$ is computed using the sum of corresponding normalized distance matrices: $D = D^i +, \ldots, + D^k$. In the example using three clothing feature types, where 10 different clusters are computed for each partition, the combination of $C_I$ and $C_{II}$ provides a final cluster ensemble set composed of 10×(3+4)=70 different partitions (using the three individual clothing features, plus all four different types of combinations of the three clothing features). In an example, each partition can be computed using a hierarchical clustering algorithm (such as but not limited to average-linkage clustering) applied to the distance matrix.

In block 310, a cluster consensus function is applied to combine the multiple partitions computed in block 308 into a final consolidated clothing clustering C. In the example using three clothing feature types, where 10 different clusters are computed for each partition, the consensus function can be used to combine the 70 different partitions. For example, a hypergraph modeling, including a HyperGraph Partitioning Algorithm (HGPA), can be used. The amount of shared information between two partitions can be measured by the Normalized Mutual Information. Mutual information can provide a measure of how much one random variable can tell about another, in that it can be used to indicate a reduction in uncertainty in one variable given knowledge of another. See, ag., T. M. Cover and J. A. Thomas, 1991, "Elements of information theory," John Wiley & Sons, NY. For example, high mutual information can indicate a large reduction in uncertainty (e.g., have a high similarity) between two random variables, low mutual information can indicate a small reduction (e.g., have a low similarity), and zero mutual information can indicate that two random variables are independent. In an example implementation, the consensus function searches for a final clustering that shares the most information with the original partitions, that is, the C with maximum mutual information with the partitions. In approximating this maximum mutual information objective with a constrained minimum cut objective, HGPA algorithm poses the cluster ensemble problem as a partitioning problem of a hypergraph where hyperedges represent clusters. This problem can be solved by a standard hypergraph partitioning package (HMETIS). See, e.g., A. Strehl and J. Ghosh, "Cluster ensembles—a knowledge reuse framework for combining multiple partitions," JMLR, 2002. For example, the consensus function can identify a consensus clothing clustering that has member clusters that share the most information with members of the clusters of the other partitions. A similarity can be determined, e.g., by computing a distance measure between pairs of clothing regions, where a final consensus clothing clustering can be determined to have a minimum distance from the clusters of the multiple partitions as compared to the original clusters of the multiple partitions.

Figure 6:
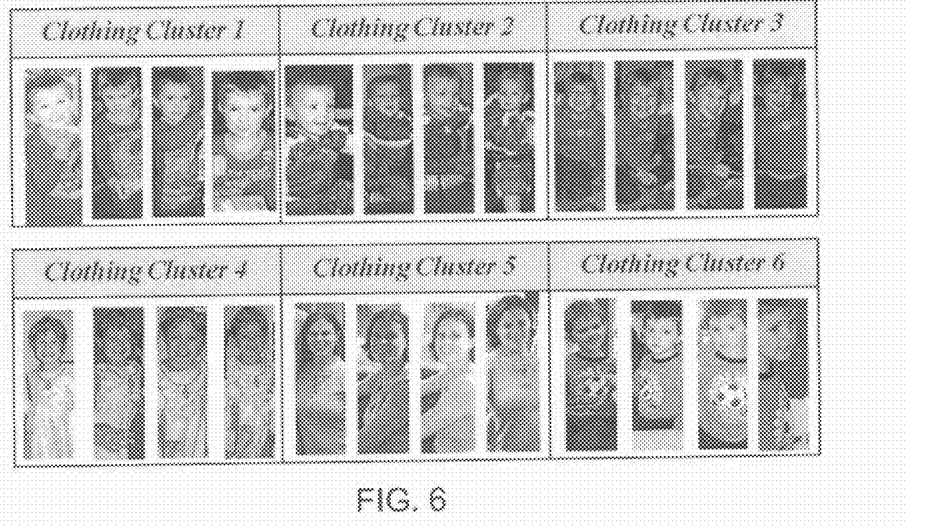
FIG. 6 shows an example of clothing clusters obtained using an image dataset.

In block 312, the final consolidated clothing clustering C computed based on the cluster ensemble set is used to generate at least one clothing cluster from the images 12. FIG. 6 shows examples of clothing clusters obtained using images from an image dataset, the CMU dataset. See, A. C. Gallagher and T. Chen. "Using context to recognize people in consumer images," IPSJ Transactions on Computer Vision and Applications, 2009. As shown in FIG. 6, the system and method are robust to the pose variations of objects, illumination changes and image blurring of images 12.

In another example, a clothing-based image clustering process can be performed using a plurality of images as follows. The process includes providing, for each image in the plurality of images, data representative of at least one clothing feature extracted from the clothing regions of that image and generating a cluster ensemble set by computing a predetermined number of partitions, each partition based on a distance measure computed based on the data representative of the at least one clothing feature. In this example, the distance measure computed between the clothing features can be a pair-wise distance measure (such as but not limited to a distance matrix). Each partition can be computed via an efficient hierarchical clustering algorithm (average-link) applied to the distance matrix. A cluster consensus function is used for combining the different partitions into a final clothing clustering. The consensus function can be a hypergraph modeling using a HyperGraph Partitioning Algorithm. At least one clothing cluster is generated from the plurality of images based on the final clothing clustering. Information indicative of the generated clothing cluster(s) can be output or displayed using a user interface (such as but not limited to a display monitor). In this example, the process can include, for each image in the plurality of images, segmenting clothing regions from the image based on a model of the image as a mixture that includes skin regions, hair regions and the clothing regions; and extracting data representative of the at least one clothing feature from the clothing regions. Specific clothing features can be associated with at least one person in the images. The extracted clothing features associated with the at least one person in one image can be used to detect the at least one person in other images.

The image clustering system 10 can be used for performing any of the processes described herein, including in the blocks of FIG. 2A or FIG. 3A. For example, image clustering system 10 can perform one or more of the computations described in the blocks of FIG. 2A or FIG. 3A. The image clustering system 10 can include one or more discrete data processing components, each of which may be in the form of any one of various commercially available data processing chips. In some implementations, the image clustering system 10 is embedded in the hardware of any one of a wide variety of digital and analog computer devices, including desktop, workstation, and server computers. In some examples, the image clustering system 10 executes process instructions (e,g., machine-readable code, such as computer software) in the process of implementing the methods that are described herein. These process instructions, as well as the data generated in the course of their execution, are stored in one or more computer-readable media. Storage devices suitable for tangibly embodying these instructions and data include all forms of non-volatile computer-readable memory, including, for example, semiconductor memory devices, such as EPROM. EEPROM, and flash memory devices, magnetic disks such as internal hard disks and removable hard disks, magneto-optical disks, DVD-ROM/RAM, and CD-ROM/RAM.

Figure 4:
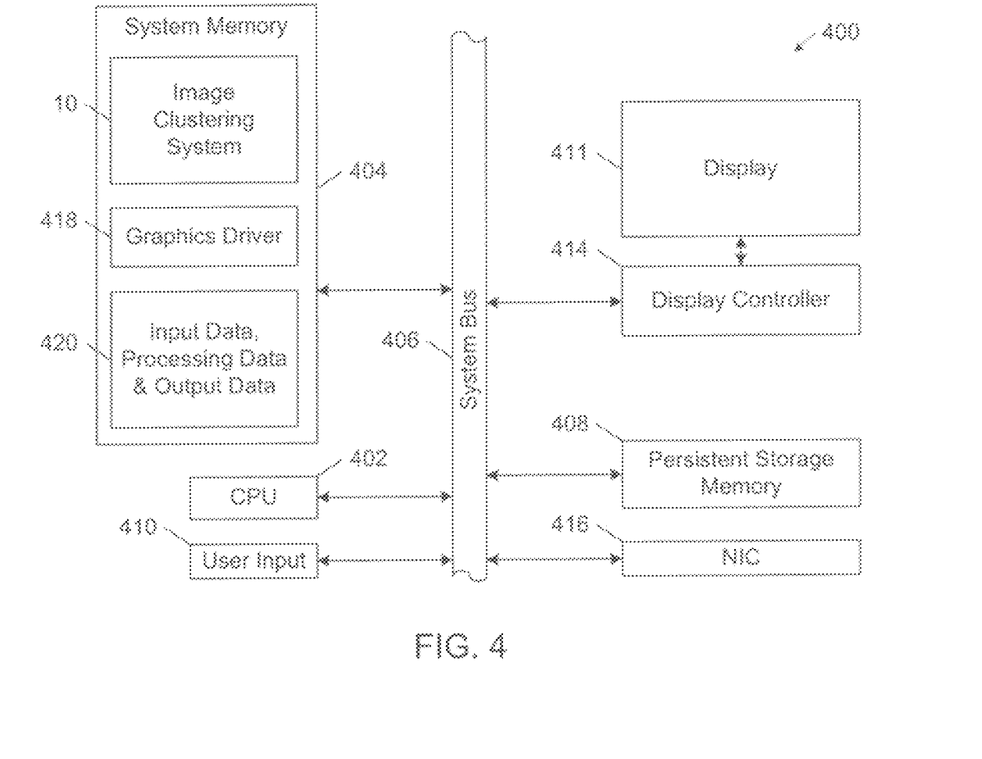
FIG. 4 shows a block diagram of an example of a computer that incorporates an example of the clothing clustering system of FIG. 1.

FIG. 4 shows an example computer system 400 that can be used to implement any of the examples of the image clustering system 10 that are described herein. The computer system 400 includes a processing unit 402 (CPU), a system memory 404, and a system bus 406 that couples processing unit 402 to the various components of the computer system 400. The processing unit 402 typically includes one or more processors, each of which may be in the form of any one of various commercially available processors. The system memory 404 typically includes a read only memory (ROM) that stores a basic input/output system (BIOS) that contains start-up routines for the computer system 400 and a random access memory (RAM). The system bus 406 may be a memory bus, a peripheral bus or a local bus, and may be compatible with any of a variety of bus protocols, including PCI, VESA, Microchannel, ISA, and EISA. The computer system 400 also includes a persistent storage memory 408 (e.g., a hard drive, a floppy drive, a CD ROM drive, magnetic tape drives, flash memory devices, and digital video disks) that is connected to the system bus 406 and contains one or more computer-readable media disks that provide non-volatile or persistent storage for data, data structures and computer-executable instructions.

A user may interact (e.g., enter commands or data, such as but not limited to the numbers of clusters to compute) with the computer system 400 using one or more input devices 410 (e.g., a keyboard, a computer mouse, a microphone, joystick, and touch pad). Information may be presented through a user interface that is displayed to a user on the display 411 (implemented by, e.g., a display monitor), which is controlled by a display controller 414 (implemented by, e.g., a video graphics card). The computer system 400 also typically includes peripheral output devices, such as speakers and a printer. One or more remote computers may be connected to the computer system 400 through a network interface card (NIC) 416.

As shown in FIG. 4, the system memory 404 also stores the image clustering system 10, a graphics driver 418, and processing information 320 that includes input data, processing data, and output data. In some examples, the image clustering system 10 interfaces with the graphics driver 418 to present a user interface on the display 411 for managing and controlling the operation of the image clustering system 10.

Following is a description of results of an example implementation of a method described herein. A PC with Intel Duo CPU 2.53 GHz, 2 GB memory and Windows Vista is used to derive the results. A MATLAB program can be used to perform segmentation of the clothing and extraction of the clothing features in a 2500×1700 color photo (can be completed in about 10-20 seconds). The codebooks for feature construction are learned off-line. The clothing matching and clustering processes can take approximately 1-1.5 minute on a 590 photo collection. The method is performed using two image datasets including photos: (1) the CMU dataset in A. C. Gallagher and T. Chen, which includes 591 family photos, and (2) a second photo dataset including 596 family photos, In the implementation of the method on the CMU dataset, a total of 846 faces, belonging to the five major family members, are identified. The classes of clothing corresponding to these faces are labeled to evaluate the performance of clothing clustering. A total of 335 clothing classes are identified in the CMU dataset.

In the implementation of the method on the second photo dataset, a total of 386 faces, belonging to the two major family members, are identified. A total of 131 classes of clothing are labeled in this dataset. There are variations in illumination, pose, expression in these datasets,

TABLE 1

Precision-Recall rates of clothing clusters on the private dataset (300 clothing clusters).

| Method | Precision | Recall |
|---|---|---|
| 1-level | 94.3% | 68.4% |
| Single best | 99.6% | 60.2% |
| Sum | 98.6% | 60.8% |
| Cluster Ensemble | 96.3% | 71.4% |

Figure 7:
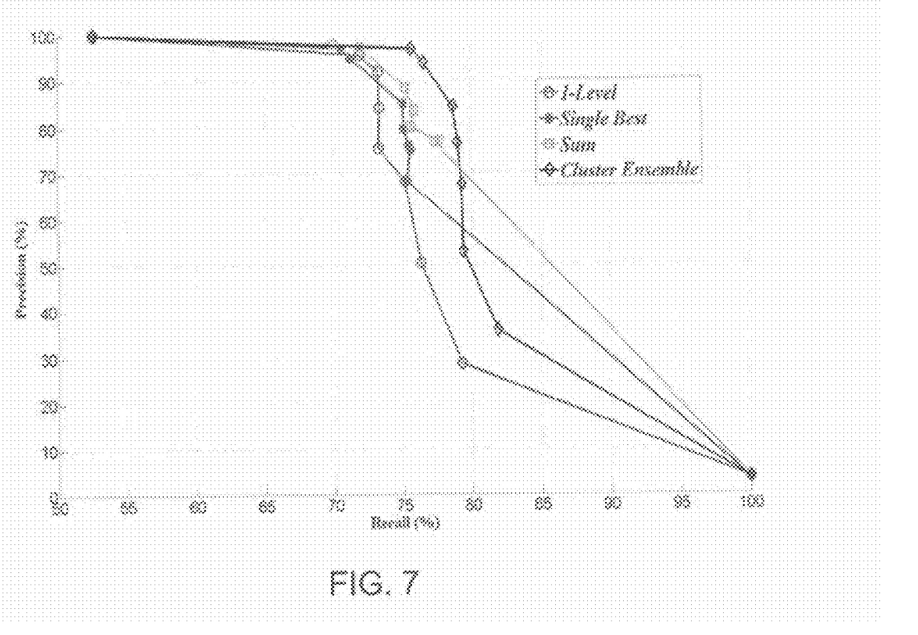
FIG. 7 shows precision-recall curves of cluster ensemble method and baseline m ethods on an image dataset.

The method disclosed herein is evaluated against the ground-truth clothing labels, using precision-recall criteria. The precision rate is determined as follows: among all of the clothes allocated to the major cluster of clothing class C (i.e., the largest cluster in which class C dominates), determine how many of them belong to class C. The recall rate is determined as follows: among all the clothes belonging to class C in the whole dataset, determine how many of them are allocated to the major cluster of class C. For example, a perfect partitioning of clothes has 100% precision and 100% recall rates. The results are displayed in FIG. 7 and summarized in Table 1. The precision-recall curves in FIG. 7 are generated by varying the number of clusters in the final clothing clustering. On both the CMU and second datasets, clothing clusters (300 final clusters) are generated with more than 90% precision and 70% recall rates. The clothing clusters is desirable for many applications.

Results have been reported for clothing information evaluated against person identities. For example, Y. Song and T. Leung, "Context-aided human recognition—clustering," ECCV 2006 report 20.1% Equal Error Rate (EER) of clothing-aided person clustering on a dataset. The results of Y. Song and T. Leung appear not to be evaluated based on clothing classes or ground-truth clothing labels.

The example results of implementation of a method disclosed herein can be compared with baseline methods under the similar parameter settings. In order to evaluate the value of the spatial pyramid structured feature, the example results of implementation of a method disclosed herein are compared to the method with 1-level pyramid (1-level). No spatial information is encoded in the 1-level method. In order to evaluate the benefit of applying a cluster ensemble and information fusing (using a cluster consensus), the example results of implementation of a method disclosed herein are compared with two baseline methods: the Single Best method and the Sum method. The Single Best method is determined as the best performance obtained by clustering on the individual feature type without information fusing. In the Sum method, instead of cluster ensemble; first obtains a sum of the normalized distance matrices and then computes the clustering on the resulting matrix. The comparison results are illustrated in FIG. 7 and Table 1. A comparison of the results of implementation of a method disclosed herein with 1-level shows that the addition of spatial information in the method disclosed herein consistently helps to improve both the precision and recall rates of the clothing clusters. A comparison of the results of implementation of a method disclosed herein with Single Best and Sum shows that, when the number of clusters is relatively large (high precision), the method disclosed herein (cluster ensemble) can significantly improve the recall rate of clothing clustering with little change in the precision rate. As a result, the method disclosed herein can be valuable for applications that require high-precision clusters to reduce the need for manual corrections within the clusters.

Many modifications and variations of this invention can be made without departing from its spirit and scope, as will be apparent to those skilled in the art. The specific examples described herein are offered by way of example only, and the invention is to be limited only by the terms of the appended claims, along with the full scope of equivalents to which such claims are entitled.

As an illustration of the wide scope of the systems and methods described herein, the systems and methods described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to carry out the methods and systems described herein.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context expressly dictates otherwise; the phrase "exclusive or" may be used to indicate situation where only the disjunctive meaning may apply.

All references cited herein are incorporated herein by reference in their entirety and for all purposes to the same extent as if each individual publication or patent or patent application was specifically and individually indicated to be incorporated by reference in its entirety herein for all purposes. Discussion or citation of a reference herein will not be construed as an admission that such reference is prior art to the present invention.

What is claimed is:

1. A method performed using a physical computer system comprising at least one processor for use in classifying images comprising:
   generating, using the computer system, clothing feature data representative of at least one clothing feature using clothing region data representative of clothing regions detected in each image of a set of images;
   generating, using the computer system, a cluster ensemble set comprising a plurality of partitions, wherein each partition comprises a clustering of the images performed independently of the other partitions based on a clothing feature or a combination of clothing features, and the generating of the cluster ensemble set comprises
   for each pair of clothing regions detected, computing a respective distance measure between the clothing feature data associated with the clothing regions to generate a distance matrix comprising the computed distance measures, and based on the distance matrix computing partitions of the cluster ensemble set having different numbers of constituent clusters; and applying, using the computer system, a cluster consensus function to combine the plurality of partitions to generate a consensus clothing clustering of the set of images, wherein the consensus clothing clustering shares nonzero mutual information with each partition of the plurality of partitions.

2. The method of claim 1, wherein the consensus clothing clustering shares maximum mutual information with the plurality of partitions.

3. The method of claim 1, further comprising computing each partition using a hierarchical clustering algorithm applied to the distance matrix using the computer system.

4. The method of claim 1, wherein the clothing feature is one or more of a color signature, a color pyramid, or a texture pyramid.

5. The method of claim 1, wherein the combination of clothing feature is a combination of color signature and color pyramid, a combination of color signature and texture pyramid, a combination of color pyramid and texture pyramid, or a combination of color signature, color pyramid and texture pyramid.

6. The method of claim 1, wherein generating clothing feature data comprises:

generating face data representing a set of detected faces from image data representing the set of images;

using the face data, defining respective facial regions for identified faces and, on the basis of the facial regions, defining respective corresponding hair regions and clothing regions;

using image data within the facial regions and hair regions, generating a measure of skin tone and hair tone for the person; and using the measures of the skin tone and the hair tone to discard those regions of the image corresponding to skin and hair within the clothing region to generate a clothing mask representing a clothing region of clothing in the images.

7. The method of claim 1, further comprising computing the mutual information as a normalized mutual information estimate using the computer system.

8. The method of claim 1, wherein the cluster consensus function is a hypergraph partitioning algorithm.

9. The method of claim 1, wherein the clustering of the images in at least two of the partitions is performed based on a same clothing feature or a same combination of clothing features, and wherein a different number of clusters is computed in each of the at least two partitions.

10. Apparatus for processing image data, comprising:
a memory storing computer-readable instructions; and
a processor coupled to the memory, to execute the instructions, and based at least in part on the execution of the instructions, to perform operations comprising:

generating clothing feature data representative of at least one clothing feature using clothing region data representative of clothing regions detected in each image of a set of images, wherein the clothing feature is a color signature, a color pyramid, or a texture pyramid;

generating a cluster ensemble set comprising a plurality of partitions, wherein each partition comprises a clustering of the images performed independently of the other partitions based on a clothing feature or a combination of clothing features, and the generating of the cluster ensemble set comprises for each pair of clothing regions detected, computing a respective distance measure between the clothing feature data associated the clothing regions to generate a distance matrix comprising, the computed distance measures, and based on the distance matrix computing partitions of the cluster ensemble set having different numbers of constituent clusters; and applying cluster consensus function to combine the plurality of partitions to generate a consensus clothing clustering, wherein the consensus clothing clustering shares nonzero mutual information with each partition of the plurality of partitions.

11. The apparatus of claim 10, wherein based at least in part on the execution of the instructions, the processor performs operations further comprising computing each partition using a hierarchical clustering algorithm applied to the distance matrix.

12. At least one non-transitory computer-readable medium storing computer-readable program code adapted to be executed by a computer to implement a method comprising:

generating clothing feature data representative of at least one clothing feature using clothing region data representative of clothing regions detected in each image of a set of images, wherein the clothing feature is a color signature, a color pyramid, or a texture pyramid;

generating a cluster ensemble set comprising a plurality of partitions, wherein each partition comprises a clustering of the images performed independently of the other partitions based on a clothing feature or a combination of clothing features, and the generating of the cluster ensemble set comprises for each pair of clothing regions detected, computing a respective distance measure between the clothing feature data associated with the clothing regions to generate a distance matrix comprising the computed distance measures, and based on the distance matrix computing partitions of the cluster ensemble set having different numbers of constituent clusters; and applying a cluster consensus function to combine the plurality of partitions to generate a consensus clothing clustering of the set of images, wherein the consensus clothing clustering shares nonzero mutual information with each partition of the plurality of partitions.

13. The method of claim 1, wherein the applying comprises combining the plurality of partitions to generate the consensus clothing clustering of the set of images to have a minimum distance from the plurality of partitions.

14. The method of claim 1, wherein the applying comprises searching for a clustering of the set of images that has a minimal distance from the plurality of partitions.

* * * * *

UNITED STATES PATENT AND TRADEMARK OFFICE
CERTIFICATE OF CORRECTION

PATENT NO. : 8,861,873 B2
APPLICATION NO. : 13/642352
DATED : October 14, 2014
INVENTOR(S) : Tong Zhang et al.

It is certified that error appears in the above-identified patent and that said Letters Patent is hereby corrected as shown below:

In the Claims,

In column 14, line 9, in Claim 10, delete "the" and insert -- with the --, therefor.

In column 14, line 10, in Claim 10, delete "comprising," and insert -- comprising --, therefor.

Signed and Sealed this
Twenty-fourth Day of February, 2015

Michelle K. Lee
*Deputy Director of the United States Patent and Trademark Office*